US006969111B2

(12) United States Patent
Ota (10) Patent No.: US 6,969,111 B2
(45) Date of Patent: Nov. 29, 2005

(54) SEALING STRUCTURE OF SLIDING ROOF OF MOTOR VEHICLE (75) Inventor: Tomoki Ota, Aichi-ken (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 0 days.

(21) Appl. No.: 10/764,597

(22) Filed: Jan. 27, 2004

(65) Prior Publication Data

US 2004/0232733 A1 Nov. 25, 2004

(30) Foreign Application Priority Data

Jan. 29, 2003 (JP) .............................. 2003-020552
Feb. 13, 2003 (JP) .............................. 2003-034952
Feb. 14, 2003 (JP) .............................. 2003-036012
Feb. 14, 2003 (JP) .............................. 2003-036147

(51) Int. Cl.[7] ............................................ B60J 10/12
(52) U.S. Cl. ............. 296/213; 296/216.06; 296/216.08
(58) Field of Search ...................... 296/216.06–216.08, 296/213

(56) References Cited

U.S. PATENT DOCUMENTS 4,231,608 A * 11/1980 Sorensen ............... 296/216.06
4,487,449 A * 12/1984 Igel et al. .............. 296/216.07
4,666,206 A * 5/1987 Hough .................. 296/216.07
4,733,904 A * 3/1988 Snyder ........................ 296/213
5,727,839 A * 3/1998 Ruhringer et al. ........... 296/213
6,270,154 B1 * 8/2001 Farber ......................... 296/213
6,685,263 B2 * 2/2004 Sawada et al. ......... 296/216.06

FOREIGN PATENT DOCUMENTS

| JP | U-H07-35142 | 6/1995 |
| JP | A-H09-207580 | 8/1997 |
| JP | A-2000-335255 | 5/2000 |

* cited by examiner

Primary Examiner—Dennis H. Pedder
(74) Attorney, Agent, or Firm—Posz Law Group, PLC (57) ABSTRACT A sealing structure for sealing between a sliding roof and an opening portion of a roof panel of a motor vehicle. The sealing structure includes an annular frame member which is secured along the opening portion of the roof panel, an annular roof panel main seal for contacting a lower surface of a periphery of the sliding roof when the sliding roof is closed, and a roof panel sub-seal for contacting side edges of the sliding roof when the sliding roof is closed. The roof panel main seal and the roof panel sub-seal are attached to the annular frame member.

8 Claims, 10 Drawing Sheets

SEALING STRUCTURE OF SLIDING ROOF OF MOTOR VEHICLE

CROSS-REFERENCE TO RELATED APPLICATION

This application is related to and claims priority from Japanese patent applications Nos. 2003-020552, 2003-034952, 2003-036012 and 2003-036147, incorporated herein by reference.

BACKGROUND OF THE INVENTION

1. Field of the Invention

The present invention relates to a sealing structure for sealing between a periphery of a sliding roof and an opening portion of a roof panel of a motor vehicle and, more particularly, to a sealing structure for a tiltable sliding roof of a motor vehicle.

2. Description of Related Art

Figure 1:
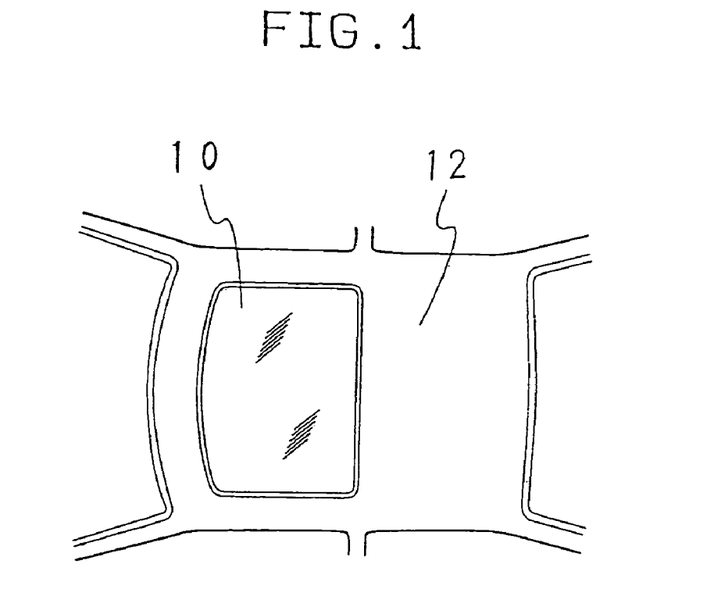
FIG. 1 is a plan view of a roof of a motor vehicle provided with a sliding roof.

As shown in FIG. 1, a sliding roof 10 is provided to open and close a roof opening formed in a roof panel 12 of a motor vehicle. To close the roof opening, the sliding roof 10 is slid frontward, and to open the roof opening, the sliding roof 10 is slid rearward (Publication of unexamined patent application No. 2000-335255, ex.).

Figure 2:
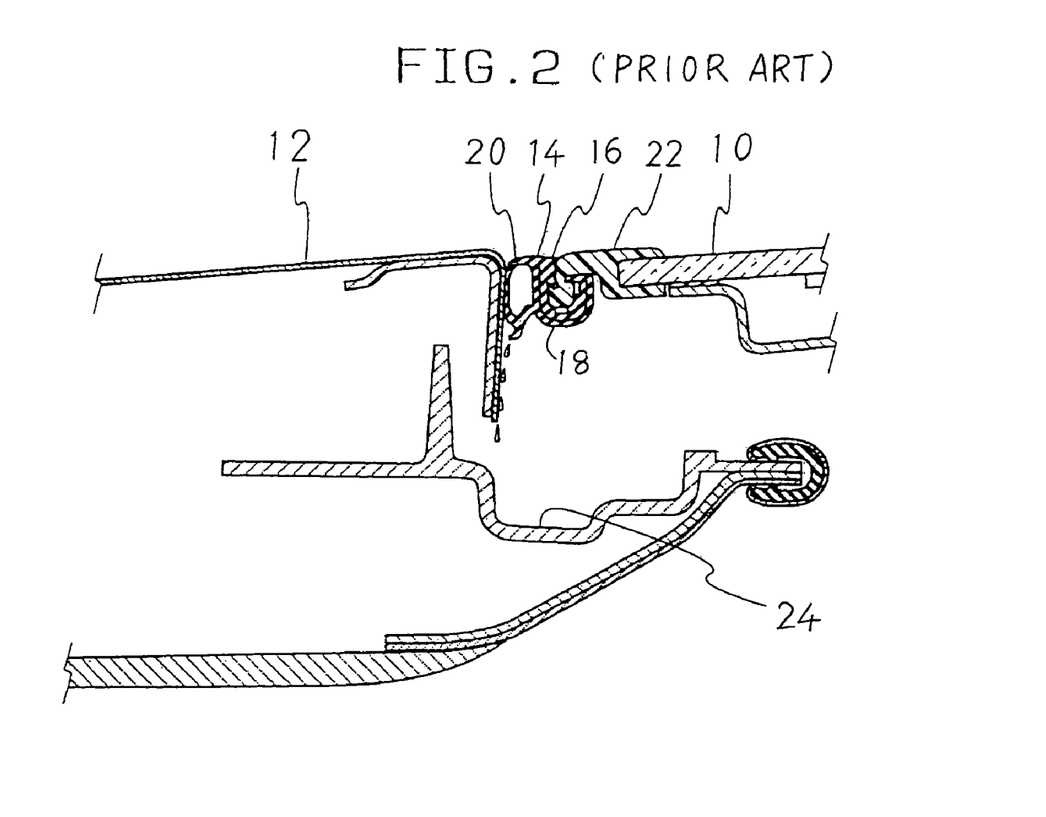
FIG. 2 is a partially cut-away cross-sectional view of one example of a conventional sealing structure for a sliding roof of a motor vehicle.

To prevent intrusion of rainwater, etc. into a vehicle compartment, as shown in FIG. 2, a roof panel seal 14 is attached to a periphery of the sliding roof 10 so as to seal a gap between an opening portion 16 of the roof panel 12 and the sliding roof 10.

The roof panel seal 14 includes a base portion 18 to be attached to the sliding roof 10, and a tubular portion 20 integrally formed with the base portion 18. The roof panel seal 14 is composed of rubber or thermoplastic elastomer. To attach the roof panel seal 14, the base portion 18 is fitted on a moulding 22 provided along the periphery of the sliding roof 10.

When the sliding roof 10 is closed, the tubular portion 20 pushes and seals a vertical wall of the roof panel 12. The tubular portion 20 may not always push the vertical wall constantly due to the variation of the sliding conditions of the sliding roof 10 or the assembling conditions of a vehicle body. If the pushing force of the tubular portion 20 is small, rainwater, etc. may intrude inside the sliding roof 10 through a gap between the tubular portion 20 and the vertical wall of the roof panel 12.

Rainwater, etc. intruded flows along the tubular portion 20 and drops into a drip channel 24 provided under the opening portion of the roof panel 12 (Publication of unexamined patent application No. Hei 9-207580, ex.). For providing the drip channel 24, a space is needed, thereby increasing the thickness of the roof of the motor vehicle.

To open and close the roof opening of the roof panel 12, the sliding roof 10 is tilted up or down. For ensuring the tilting operation of the sliding roof 10, the drip channel 24 must be spaced from the sliding roof 10 so that it has been difficult to make the roof compact.

While the sliding roof 10 is repeatedly tilted up and down, the tubular portion 20 of the roof panel seal 14 rubs the vertical wall of the roof panel 12 to cause wear thereof. And the tubular portion 20 moves vertically with the titling operation of the sliding roof 10 to cause the scattering in the contacting state of the tubular portion 20 and the facing vertical wall of the roof panel 12, thereby decreasing the sealing properties of the tubular portion 20.

To overcome this problem, it has been tried to attach a roof panel seal to the opening portion 16 of the roof panel 12 so as to contact a lower surface of the periphery of the sliding roof 10 in a closed state. To cover the periphery of the rectangular sliding roof 10 entirely, the roof panel seal must be formed into a four-sided configuration, and to effect sufficient sealing properties, the roof panel seal must be attached to the opening portion 16 securely. Accordingly, the roof panel seal has been attached to the opening portion 16 with clips and double-sided adhesive tapes.

Normally, the double-sided adhesive tape has a long straight configuration. When the long and straight double-sided adhesive tape is bonded to the roof panel seal having a four-sided configuration, it must be bent in conformity with corners of the roof panel seal. Upon bending, the double-sided adhesive tape wrinkles to produce irregularities after bonded, which may deteriorate the bonding properties. The double-sided adhesive tapes exhibit flexibility and are easy to stretch. Consequently, upon bonding, ends of the double-sided adhesive tapes may stretch and overlap each other, thereby deteriorating the bonding properties and the sealing properties of the double-sided adhesive tapes.

Furthermore, it has been demanded to increase the opening area of the roof panel 12 for brightening a vehicle compartment, enabling good flowing of air, improving the relaxing feeling and obtaining a good view.

Where the sliding roof 10 is composed of a single sliding panel, it must be slid by a long distance to open and close the roof opening, thereby enlarging the driving mechanism for the sliding roof 10, and deteriorating the designing properties thereof. And when the sliding roof 10 is slid rearward, it may project rearwardly of the vehicle body.

Under the above circumstances, it has been also tried to compose the sliding roof 10 of a plurality of sliding panels which are arranged longitudinally of the vehicle body. With this arrangement, however, sealing is needed between adjacent sliding panels.

To effect sealing between adjacent sliding panels, weather strips are respectively attached to facing surfaces thereof (Publication of unexamined utility model application No. Hei 7-35142, ex.).

To attach the weather strips to the adjacent sliding panels, respectively, it takes much trouble and time, and accordingly, production costs increase.

In addition, the weather strips may not always contact the facing surfaces properly, because of the variation of the assembling state of the plurality of sliding panels and the deformation of the weather strips attached to the sliding panels.

Furthermore, the weather strip may have a tubular seal portion for improving the sealing properties. The tubular seal portion, however, has the problem that when the sliding roof is opened, a seal wall of the tubular seal portion may remain closely contact with a base portion of the weather strip without returning to its original protruded configuration. In addition, the seal wall of the tubular seal portion may generate noise when leaving the base portion of the weather strip.

SUMMARY OF THE INVENTION

Accordingly, it is an object of the present invention to provide a sealing structure for providing a seal between a tiltable sliding roof and an opening portion of a roof panel of a motor vehicle, which is compact and exhibits excellent sealing properties.

A first aspect of the sealing structure in accordance with the present invention includes an annular frame member which is secured along the opening portion of the roof panel, an annular roof panel main seal for contacting a lower surface of a periphery of the sliding roof when the sliding roof is closed, and a roof panel sub-seal for contacting side edges of the sliding roof when the sliding roof is closed. The annular roof panel main seal and the roof panel sub-seal are attached to the annular frame member.

With the first aspect of the present invention, since the annular roof panel main seal and the roof panel sub-seal are first attached to the annular frame member, and then the annular frame member is secured along the opening portion of the roof panel, the annular roof panel main seal and the roof panel sub-seal can be readily installed in the roof panel.

Since the annular roof panel main seal is attached to the annular frame member, a tubular seal portion thereof can contact the lower surface of the periphery of the sliding roof in a direction nearly perpendicular to the lower surface of the sliding roof when the sliding roof is closed, whereby when a gap between the sliding roof and the roof panel main seal scatters, the tubular seal portion can flex and exert a predetermined pressing force, and accordingly, good sealing properties can be effected. In addition, where the sliding roof tilts, the tubular seal portion does not rub transversely so as not to generate wear, thereby effecting a stable seal between the sliding roof and the opening portion of the roof panel.

Furthermore, since no joint exists in the roof panel main seal, rainwater, etc. is prevented from passing the annular roof panel main seal and intruding into a vehicle compartment.

Since the roof panel sub-seal is attached to the frame member so as to contact side edges of the sliding roof in a closed position, the side edges and the lower surface of the sliding roof can be sealed doubly, whereby stable sealing can be provided.

Since the roof panel sub-seal is attached to the frame member without moving frontward and rearward, it does not wear greatly when the sliding roof slides frontward and rearward. When the sliding roof finally tilts down, the roof panel sub-seal contacts the sliding roof to ensure a good seal.

Since the frame member defines a drip channel between the roof panel main seal and the roof panel sub-seal, it is unnecessary to provide a drip channel separately from the frame member, and accordingly, the vehicle roof can be made compact.

In a preferred embodiment, the sliding roof is composed of at least two glass panels or at least two transparent synthetic resin panels, which are arranged longitudinally of the vehicle body.

With this arrangement, since the sliding roof is divided into at least two panels longitudinally of the vehicle body, the roof opening can be enlarged. Since the annular roof panel main seal is provided, the sealing properties in joints between adjacent panels of the sliding roof can be ensured.

In addition, the roof panel sub-seal provides a continuous single seal against the side edges of the sliding roof from a front end to a rear end thereof without any interruption between adjacent sliding panels of the sliding roof, thereby ensuring good sealing properties.

In another preferred embodiment, the roof panel main seal includes a flat plate-shaped base portion for attachment to the frame member, and a tubular seal portion protruding upwardly of the base portion into an arc-shaped configuration. The roof panel sub-seal includes a base portion having a generally U-shaped cross-section, and a tubular seal portion protruding inwardly of the base portion into an arc-shaped configuration.

With this arrangement, when the roof panel main seal is attached to the frame member, the tubular seal portion of the roof panel main seal protrudes upwardly of the base portion into an arc-shaped configuration. Accordingly, it can contact the sliding roof in a direction perpendicular thereto, and readily flex, whereby where a lap between the tubular seal portion and the sliding roof is small, a sufficient pressing force can be obtained and good sealing properties can be effected. In addition, the pressing force of the tubular seal portion against the sliding roof does not vary greatly where the lap between the tubular seal portion and the sliding roof varies, whereby stable sealing properties can be effected without affecting the closing movement of the sliding roof.

In addition, when the roof panel sub-seal is attached to the frame member, the tubular seal portion of the roof panel sub-seal can protrude inwardly of the roof opening into an arc-shaped configuration, it can contact an edge of the sliding roof or a moulding mounted thereto elastically when the sliding roof tilts up and down, and if the lap between the tubular seal portion and the sliding roof is small, a sufficient pressing force can be obtained to exhibit good sealing properties.

In a still another preferred embodiment, the roof panel main seal includes a flat plate-shaped base portion for attachment to the opening portion of the roof opening and a tubular seal portion provided integrally with the base portion. A double-sided adhesive tape is bonded to a surface of the base portion, which is opposite to the tubular seal portion, and the base portion is attached to the opening portion with the double-sided adhesive tape. The double-sided adhesive tape includes a curved double-sided adhesive tape for attachment to a corner of the opening portion, which has the same curvature as that of the corner of the opening portion.

With this arrangement, since the curved double-sided adhesive tape has the same curvature as that of a corner of the opening portion, it can be readily attached to the corner of the opening portion. Accordingly, it is unnecessary to bend a straight double-sided adhesive tape in conformity with the corner of the opening portion, whereby the double-sided adhesive tape can be bonded speedily, and the curved double-sided adhesive tape does not wrinkle so that no irregularity is generated in the curved double-sided adhesive tape. Consequently, the curved double-sided adhesive tape can be bonded to the corner of the opening portion uniformly with increased bonding force and the sealing properties between the curved double-sided adhesive tape and the corner of the opening portion can be improved.

In another preferred embodiment, the double-sided adhesive tape further includes a straight double-sided adhesive tape for attachment to a straight part of the opening portion, and the curved double-sided adhesive tape and the straight double-sided adhesive tape are bonded such that side edges of ends thereof contact each other.

With this arrangement, when the curved double-sided adhesive tape and the straight double-sided adhesive tape are bonded to the roof panel main seal, expansion and contraction of these double-sided adhesive tapes can be absorbed. In addition, since the side edges of the ends of these double-sided contact each other, rainwater, etc. can be prevented from intruding into a vehicle compartment after flowing along the ends of the double-sided adhesive tapes.

In another preferred embodiment, the double-sided adhesive tape further includes a straight double-sided adhesive tape for attachment to a straight part of the opening portion, the curved double-sided adhesive tape and the straight double-sided adhesive tape are bonded such that ends thereof face each other with a space, and a short double-sided adhesive tape is further bonded so as to extend in parallel with and adjacently to the ends of the curved double-sided adhesive tape and the straight double-sided adhesive tape, and cover the space therebetween.

With this arrangement, it is unnecessary to bend the end of the double-sided adhesive tape, thereby facilitating the attachment of the roof panel main seal.

Since the short double-sided adhesive tape is bonded so as to cover the space between the curved double-sided adhesive tape and the straight double-sided adhesive tape, rainwater, etc. can be prevented from intruding into a vehicle compartment after passing this space.

In another preferred embodiment, the double-sided adhesive tape further includes a straight double-sided adhesive tape for attachment to a straight part of the opening portion. The curved double-sided adhesive tape and the straight double-sided adhesive tape are bonded such that ends thereof face each other with a space therebetween. And a short double-sided adhesive tape of which one end is flat and the other end bends into an L-shaped longitudinal section is bonded to cover the space between the ends of the curved double-sided adhesive tape and the straight double-sided adhesive tape such that the flat end of the short double-sided adhesive tape contacts one of the ends of the curved double-sided adhesive tape and the straight double-sided adhesive tape, and the other one of the ends of the curved double-sided adhesive tape and the straight double-sided adhesive tape contacts the other L-shaped end of the joining double-sided adhesive tape in parallel with each other.

With this arrangement, the space between the ends of the curved double-sided adhesive tape and the straight double-sided adhesive tape can be covered with the short double-sided adhesive tape, and it is unnecessary to bend the end of the double-sided adhesive tape, thereby facilitating the attachment of the roof panel main seal.

In addition, since one end of the curved double-sided adhesive tape or the straight double-sided adhesive tape contacts the L-shaped end of the short double-sided adhesive tape in parallel with each other, the sealing properties are improved. Where a gap is generated between two double-side adhesive tapes at the joint thereof, rainwater or the like can be prevented from intruding into a vehicle compartment after passing the gap.

In another preferred embodiment, the sliding roof includes a plurality of sliding panels arranged longitudinally of a vehicle body. A panel seal is provided to seal between adjacent sliding panels. The panel seal includes a rear seal having a base part for attachment to a front edge of a rear-side sliding panel, and a seal wall formed integrally with the base part so as to protrude upwardly therefrom, a front seal provided on the front side of the rear seal, and having a base part which extends in a longitudinal direction thereof, and a seal wall formed integrally with the base part so as to protrude upwardly therefrom, and a connecting part for connecting the base part of the rear seal and the base part of the front seal to each other. The rear seal, the front seal and the connecting part define a U-shaped drain channel, and the seal walls of the rear seal and the front seal are arranged so as to contact a rear edge of the sliding panel on the front side of the panel seal, thereby effecting double sealing.

With this arrangement, double sealing is effected between adjacent sliding panels.

Since the panel seal is attached only to the front edge of the rear-side sliding panel, the attachment of the panel seal can be facilitated, and the scattering in the attachment state can be reduced.

In addition, the U-shaped drain channel is defined by the rear seal, the front seal and the connecting part, rainwater, etc. remaining on the upper surface of the sliding panel drops into the defined drain channel and is discharged outside the drain channel. Accordingly, rainwater, etc. remaining on the upper surface of the sliding panel can be prevented from intruding into a vehicle compartment.

In another preferred embodiment, the rear seal of the panel seal has a plurality of depressions in an upper surface of the base part so as to extend in the longitudinal direction thereof.

With this arrangement, even where the rear seal is compressed and the seal wall thereof is brought into contact with the upper surface of the base part, the contacting area between the seal wall and the base part can be decreased by virtue of the depressions extending in the upper surface of the base part, thereby preventing the seal wall from contacting the base part closely. Consequently, when the sliding roof is opened, the seal wall instantly separates from the base part without generating noise, and the rear seal returns to its uncompressed configuration. In addition, since not projections but depressions are formed in the upper surface of the base part, the wall thickness of the base part can be decreased, thereby reducing the weight thereof, and since the distance between the seal wall and the base part is not decreased, the seal wall does not strongly contact the upper surface of the base part.

In another preferred embodiment, the base part of the rear seal, the base part of the front seal and the connecting part are composed of a solid material such as solid rubber, solid thermoplastic olefin elastomer (TPO), etc. and the seal wall of the rear seal and the seal wall of the front seal are composed of a sponge material such as sponge rubber, sponge TPO, etc.

With this arrangement, the gap between adjacent sliding panels can be sealed with the flexible seal walls of the rear seal and the front seal of the panel seal. Since the base part of the rear seal, the base part of the front seal and the connecting part are composed of a solid material, and the base parts of the rear and front seals are integrally connected by the connecting part, high rigidity is effected. By securing one of the rear seal and the front seal to a front edge of one sliding panel, both seals can be secured thereto, thereby facilitating the attachment of the panel seal.

In addition, where the seal walls of the rear seal and the front seal, which are connected by the connecting part are compressed by the closed sliding panel; the rear seal and the front seal do not overlap with each other, and when the seal wall of one of the rear seal and the front seal deforms, it does not affect the seal wall of the other one of the rear seal and the front seal.

In another preferred embodiment, a resin moulding is mounted on a front edge of a rear-side sliding panel, and another resin moulding is mounted on a rear edge of a front-side sliding panel. And the panel seal is secured to the resin moulding mounted on the rear-side sliding panel. When the sliding roof is closed, a rear edge of the resin moulding mounted on the rear edge of the front-side sliding panel contacts the seal wall of the rear seal of the panel seal while the lower surface thereof contacts the seal wall of the front seal of the panel seal.

With this arrangement, edges of the sliding panels can be protected by the resin mouldings. Since the configuration of each resin moulding can be designed freely, the panel seals can be attached to proper positions of the resin mouldings. In addition, since the resin moulding mounted on the front-side sliding panel contacts the seal walls of the rear seal and the front seal of the panel seal, double sealing can be effected, thereby improving the sealing properties and sound isolating properties.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, several embodiments of the sealing structure in accordance with the present invention will be explained with reference to FIGS. 3 through 19.

Figure 3:
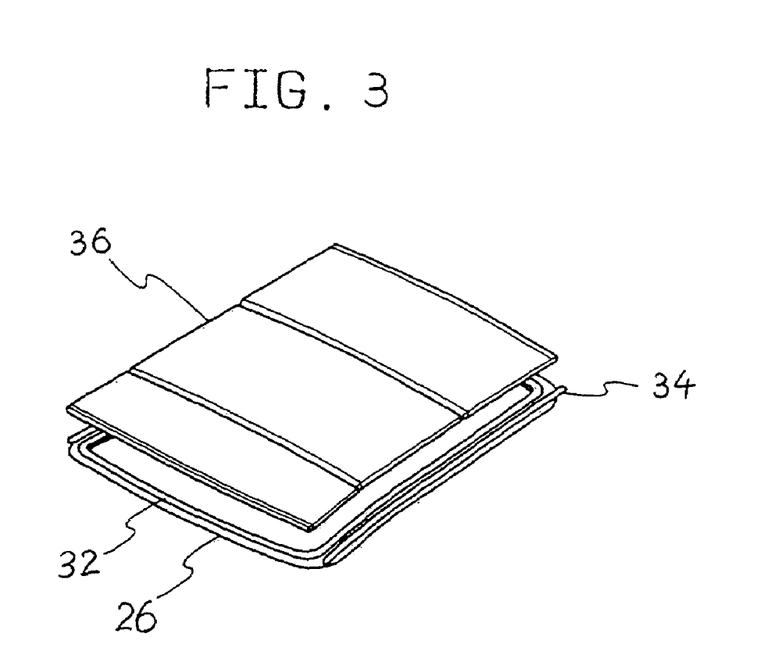
FIG. 3 is a perspective view of a sliding roof in a closed state, along with a frame member to which roof panel seals are attached in one embodiment of a sealing structure in accordance with the present invention.
Figure 5:
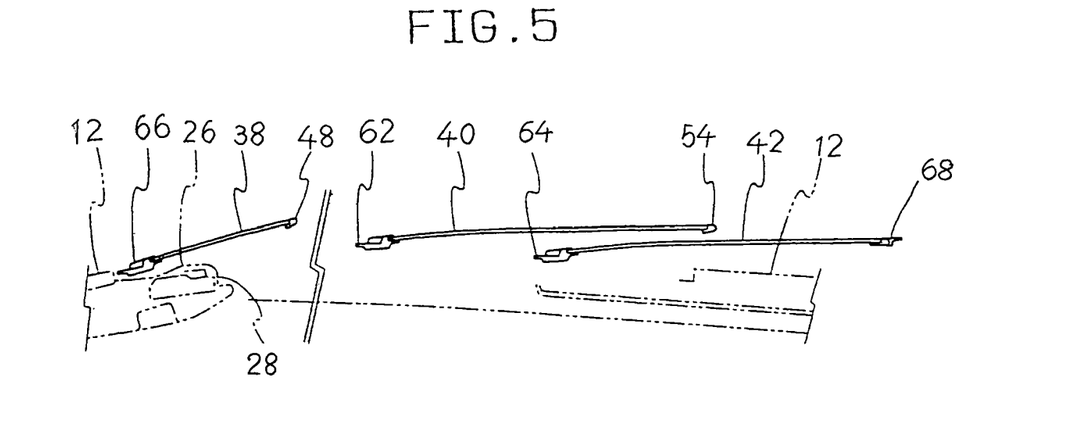
FIG. 5 is a cross-sectional view of the sliding roof composed of three sliding panels in their open positions.

As shown in FIG. 5, a frame member 26 is mounted in an opening portion 28 of a roof panel 12 (FIG. 1) of a motor vehicle. As shown in FIG. 3, the frame member 26 has a four-sided configuration, and a roof panel main seal 32 and a roof panel sub-seal 34 are attached to the frame member 26. A sliding roof 36 for closing and opening a roof opening of the roof panel 12 is mounted on the upper side of the frame member 26.

The roof panel main seal 32 has an annular four-sided configuration, and seals around a periphery of the sliding roof 36 having a rectangular configuration. The roof panel sub-seal 34 has a straight configuration, and is attached outside a longitudinal side of the main seal 32 in parallel with each other, thereby sealing a side edge of the sliding roof 36.

The sliding roof 36 is composed of three sliding panels in the present embodiment. Alternatively, the sliding roof 36 may be composed of a single sliding panel. It is preferable to form the sliding panel of the sliding roof 36 of glass or transparent synthetic resin for effecting excellent lighting properties, and improving the designing properties of the sliding roof 36.

Figure 4:
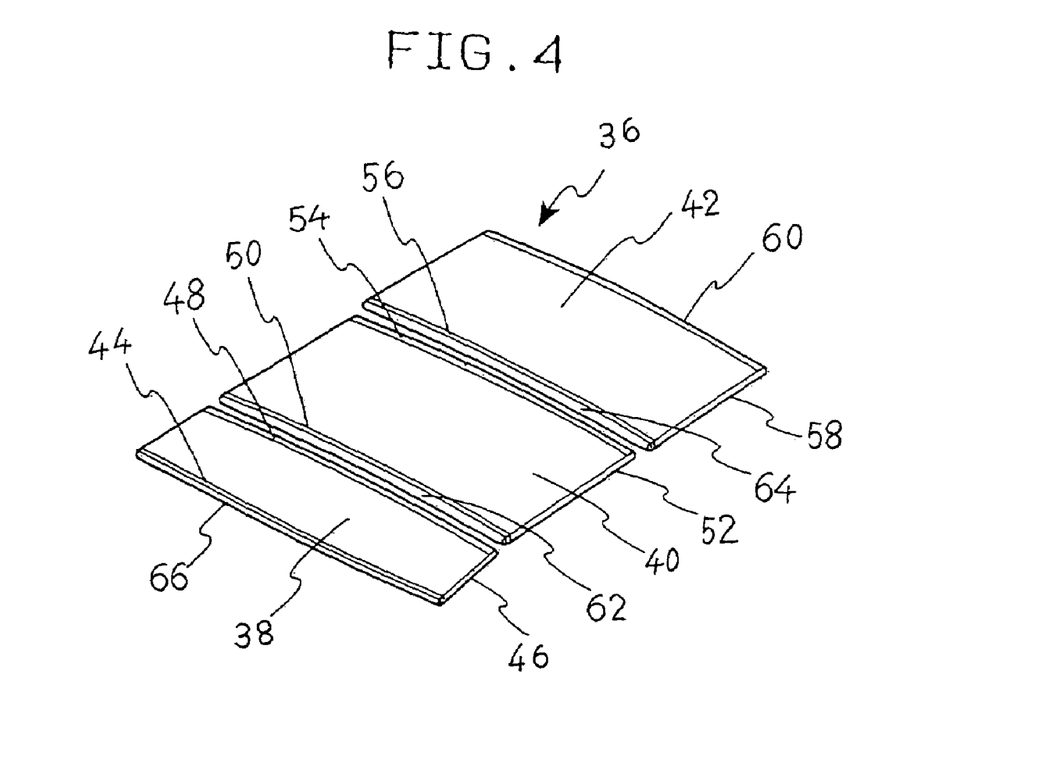
FIG. 4 is a perspective view of a sliding roof composed of three sliding panels.

In FIG. 4, the sliding roof 36 is composed of a first sliding panel 38, a second sliding panel 40 and a third sliding panel 42 which are arranged longitudinally of a vehicle body.

A front resin moulding 44 is attached along a front edge of the first sliding panel 40, a side resin moulding 46 is attached along each of side edges thereof, and a rear resin moulding 48 is attached along a rear edge thereof. A front resin moulding 50, side resin mouldings 52 and a rear resin moulding 54 are attached to the second sliding panel 40 while a front resin moulding 56, side resin mouldings 58 and a rear resin moulding 60 are attached to the third sliding panel 44, similarly to the case of the first sliding panel 38. Thus, the sliding panels 38, 40 and 42 are respectively surrounded by resin mouldings.

Figure 6:
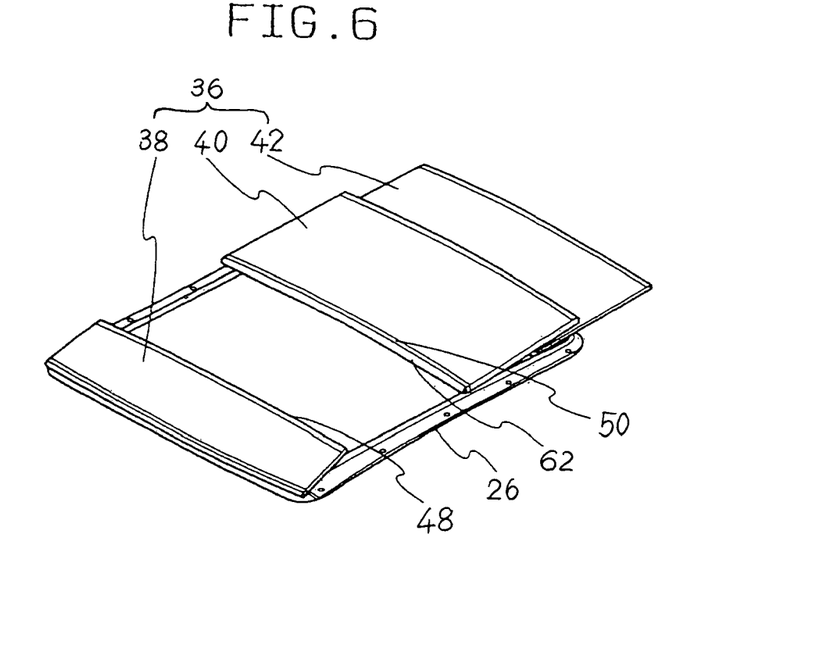
FIG. 6 is a perspective view of the sliding roof composed of three sliding panels in their open positions.

As shown in FIGS. 5 and 6, the first sliding panel 38 is mounted so as to tilt up about a front edge thereof to lift a rear part thereof, while each of the second and third sliding panels 40 and 42 is mounted so as to tilt up about a front edge thereof to lift a rear part thereof, and slide longitudinally of the vehicle body.

To open the sliding panel 36 thus arranged, the first sliding panel 38 is tilted up about the front edge thereof by a driving device (not shown) to lift a rear part thereof. Then, the second and third sliding panels 40 and 42 are respectively tilted up about the front edge thereof to lift a rear part thereof, and also slid rearward. And the second sliding panel 40 is further slid rearward to the position above the third sliding panel 42 to fully open the roof opening. When the roof opening is fully opened, the second and third sliding panels 40 and 42 are overlapped with each other, and accordingly, the sliding roof 36 does not greatly project rearward.

To close the sliding roof 36, the second and third sliding panels 40 and 42 are respectively slid frontward, and tilted down about the front edge thereof to lower the rear part thereof. Then, the first sliding panel 38 is tilted down about the front edge thereof to lower the rear part thereof. Consequently, the sliding roof 36 contacts and presses the roof panel main seal 32 and the roof panel sub-seal 34 to seal between the sliding roof 36 and the opening portion 16. Where the sliding roof 36 is composed of a single sliding panel or two sliding panels, the roof panel main seal 32 and the roof panel sub-seal 34 seal, similarly.

Where the sliding roof 36 is composed of a single sliding panel, to open the roof opening, the single sliding panel is tilted up and then slid rearward, whereas to close the roof opening, the single sliding panel is slid frontward and tilted down.

A first panel seal 62 and a second panel seal 64 are respectively provided along front edges of the second sliding panel 40 and the third sliding panel 42 to seal between the first sliding panel 38 and the second sliding panel 40, and between the second sliding panel 40 and the third sliding panel 42.

A first sliding roof sub-seal 66 and a second sliding roof sub-seal 68 are respectively provided along a front edge of the first sliding panel 38 and a rear edge of the third sliding panel 42 to seal between the first sliding panel 38 and the opening portion 28 and between the third sliding panel 42 and the opening portion 28.

Thus, the roof panel main seal 32, the roof panel sub-seal 34, the first sliding roof sub-seal 66 and the second sliding roof sub-seal 68 provide a double seal between the sliding roof 36 and the opening portion 28 over an approximately entire periphery thereof, thereby improving the sealing properties.

Figure 7:
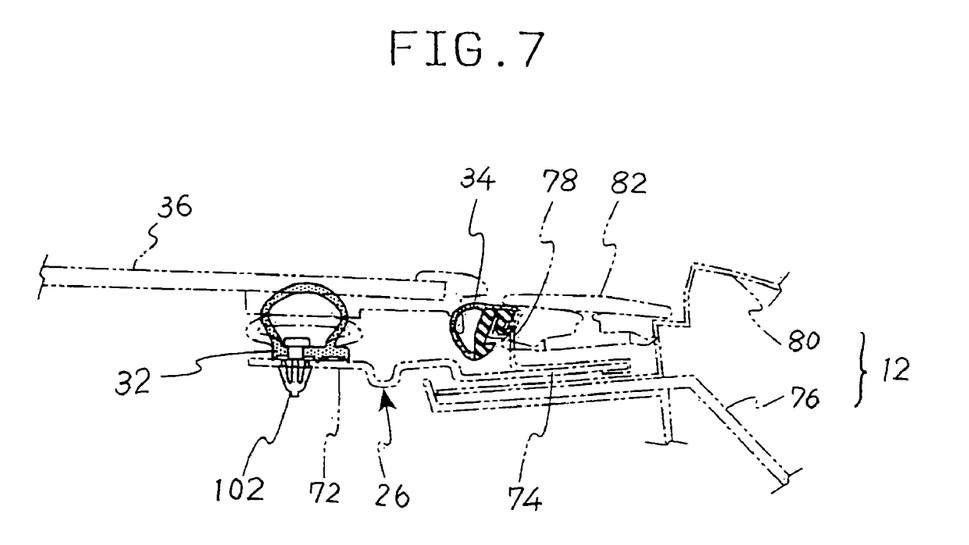
FIG. 7 is a cross-sectional view of one embodiment of a sealing structure in accordance with the present invention along a side edge of a sliding roof of the motor vehicle.

FIG. 7 shows a cross-sectional view of a side part of the sliding roof 36 in a closed position. As shown, the frame member 26 is secured to the opening portion 28 over the entire circumference thereof, and the annular roof panel main seal 32 is attached to the frame member 26. The straight roof panel sub-seal 34 is attached to the frame member 26 outside each of longitudinal parts of the roof panel main seal 32, thereby providing a double seal along side edges of the sliding roof 36.

The frame member 26 includes a protruding part 72 which protrudes into the roof opening for mounting the roof panel main seal 32, a base part 74 to be secured to an inner panel 76 of the roof panel 12, and a vertical part 78 which extends from the base part 74 vertically upward for mounting the roof panel sub seal 34. Reference numeral 80 denotes an outer panel of the roof panel 12, and reference numeral 82 denotes a roof moulding.

Figure 8:
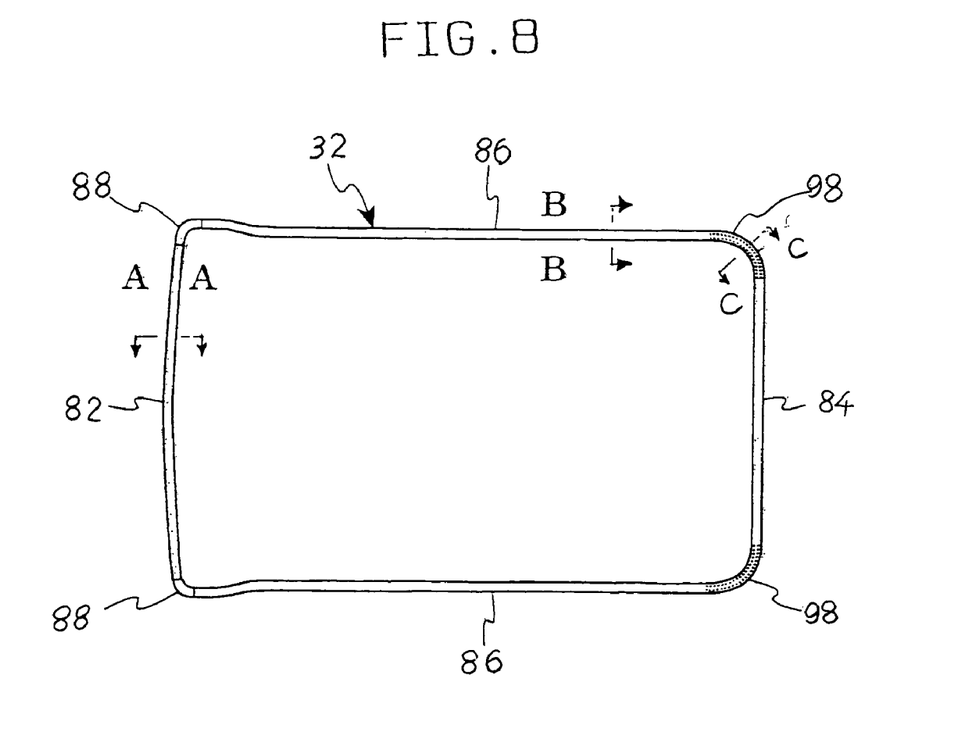
FIG. 8 is a plan view of a roof panel main seal in one embodiment of a sealing structure in accordance with the present invention.

FIG. 8 is a plan view of the roof panel main seal 32.

The roof panel main seal 32 has an annular four-sided configuration in conformity with the opening portion 28, and includes a front part 82, a rear part 84 and side parts 86. The front part 82 is formed by extrusion, while the rear part 84 and the side parts 86 are integrally formed by extrusion. The front part 82 is connected to the side parts 86 with molded front corners 88.

Figure 9:
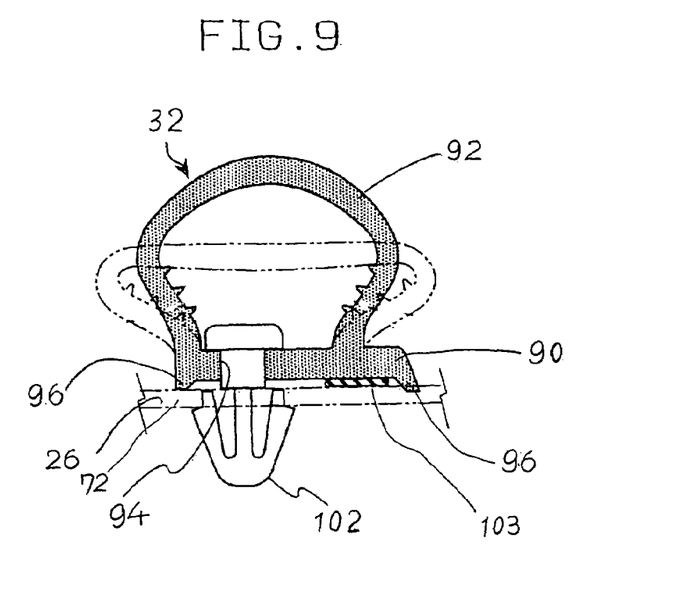
FIG. 9 is a cross-sectional view of the roof panel main seal taken along the line A—A of FIG. 8.
Figure 10:
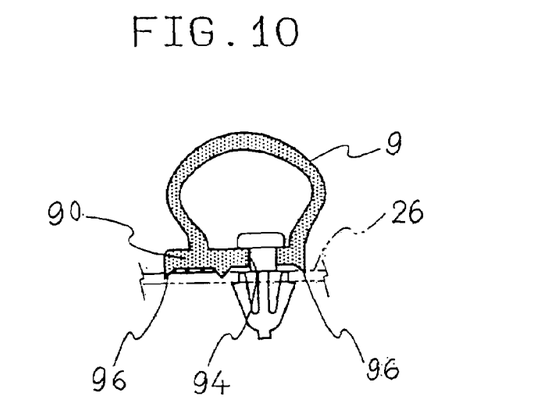
FIG. 10 is a cross-sectional view of the roof panel main seal taken along the line B—B of FIG. 8.
Figure 11:
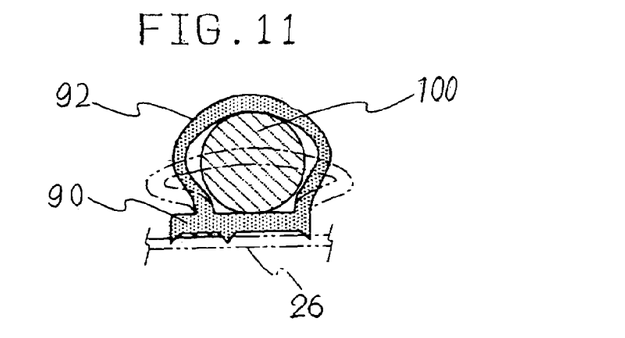
FIG. 11 is a cross-sectional view of the roof panel main seal taken along the line C—C of FIG. 8.

FIG. 9 is a cross-sectional view of the roof panel main seal 32, taken along the line A—A of FIG. 8, FIG. 10 is a cross-sectional view of the roof panel main seal 32, taken along the line B—B of FIG. 8 and FIG. 11 is a cross-sectional view of the roof panel main seal 32, taken along the line C—C of FIG. 8.

As shown, the roof panel main seal 32 has a base portion 90 to be attached to the frame member 26 and a tubular seal portion 92 provided along an upper surface of the base portion 90. Clip holes 94 are provided in the base portion 90, and protrusion 96 are provided along both side edges of the base portion 90. The base portion 90 and the tubular portion 92 are composed of a sponge material of EPDM rubber and formed by extrusion.

To attach the roof panel main seal 32 to the frame member 26, clips 102 fitted in the clip holes 94 of the base portion 90 are inserted in holes provided in the protruding part 72 of the frame member 26. This results in the protrusions 96 of the base portion 90 are pressed on the protruding part 72 of the frame member 26 to seal between the frame member 26 and the roof panel main seal 32, thereby preventing rainwater, etc. from leaking into the vehicle compartment.

In the attachment state of the roof panel main seal 32, the tubular seal portion 92 protrudes upward to contact a lower surface of the sliding roof 36 which is in a closed position. The tubular seal portion 92 is hollow, and has an arc-shaped cross-section so as to readily flex irrespective of the variation in a lap between the roof panel main seal 32 and the sliding roof 36, whereby the pushing force of the tubular seal portion 92 does not greatly vary and consequently, a stable sealing force can be effected.

In addition, when the sliding roof 36 is tilted up and down, the vertical movement of the sliding roof 36 can be readily absorbed with the deformation of the tubular seal portion 92 of the roof panel main seal 32, whereby the sealing properties can be maintained without generating wear of the tubular seal portion 92, and excellent durability can be obtained.

To increase the attaching force and sealing properties of the roof panel main seal 32, a double-sided adhesive tape 103 may be bonded to a bottom surface of the base portion 90.

As shown in FIG. 11, to prevent the deformation of the tubular seal portion 92 in each of rear corners 98 between the rear part 84 and the side parts 86, a rod-shaped sponge pad 100 is inserted in the tubular seal portion 92. To place the rod-shaped sponge pad 100 in position, first, the sponge pad 100 is inserted from an end of the tubular seal portion 92, and an air pressure is supplied to the sponge pad 100 while half closing a portion for defining each rear corner 98. Then, the tubular seal portion 92 is bent along with the sponge pad 100 to form each rear corner 98. With this method, the tubular seal portion 92 does not deform in each rear corner 98, and good sealing properties can be effected.

Figure 12:
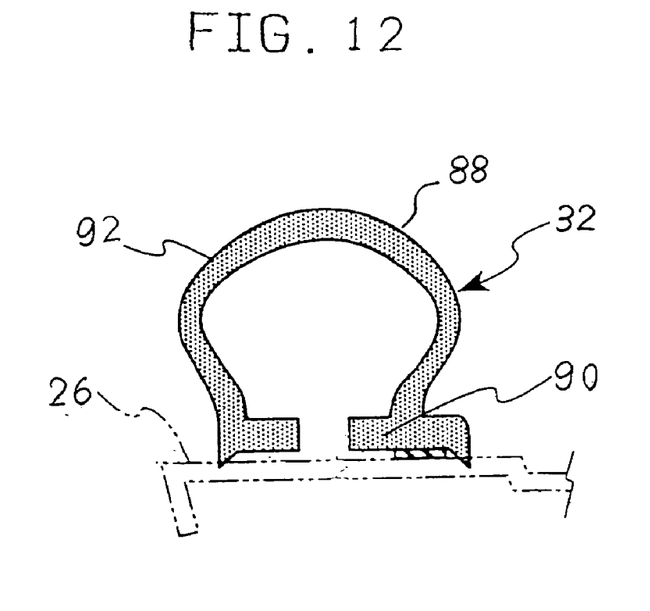
FIG. 12 is a cross-sectional view of the roof panel main seal at a front corner thereof.

FIG. 12 shows a cross-section of the front corner 88 of the roof panel main seal 32. To form the front corner 88, an end of the front part 82 and an end of the side part 86 are placed in a cavity (not shown) of a mold (not shown), and a rubber material identical to that of the front part 82 and the side part 86, such as EPDM rubber, is injected into the cavity of the mold, and vulcanized to connect the front part 82 and the side part 86 to each other. Since the injecting material is identical to that of the front part 82 and the side part 86, these parts 82 and 86 can be jointed upon vulcanization. The base portion 90 of the front corner 88 includes a through hole for removing a core for forming the tubular seal portion 92. After removing the core, most of the through holes are closed with an adhesive agent.

Figure 13:
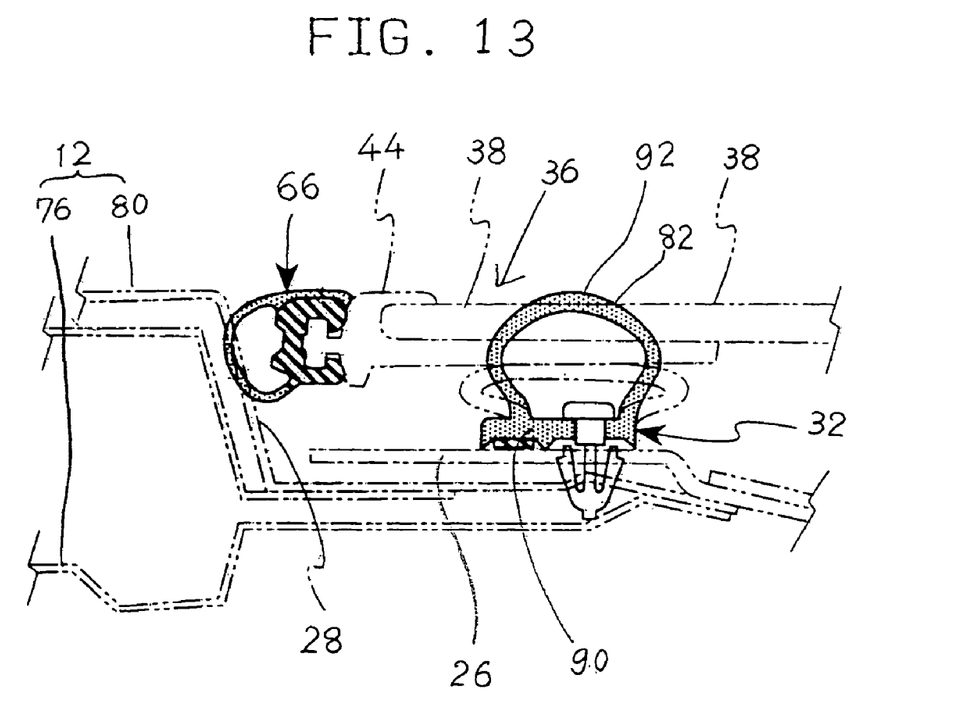
FIG. 13 is a partially cut-away cross-sectional view of one embodiment of a seating structure in accordance with the present invention along a front edge of a sliding roof of the motor vehicle.

FIG. 13 is a cross-sectional view of a front part of the sliding roof 36 in a closed position. As shown, the base portion 90 of the roof panel main seal 32 is attached to the frame member 26 secured to the opening portion 28 of the roof panel 12. The tubular seal portion 92 of the front part 82 of the roof panel main seal 32 contacts a lower surface of the first sliding panel 38. The front moulding 44 is provided along the front edge of the first sliding panel 38, and the first sliding roof sub-seal 66 is attached to the front moulding 44. When the fist sliding panel 38 is closed, the first sliding roof sub-seal 66 contacts the outer panel 80 of the roof panel 12 to seal between the first sliding panel 38 and the outer panel 80.

Where the front moulding 44 covers the lower surface of the first sliding panel 38 over a great area thereof, the tubular seal portion 92 of the roof panel main seal 32 may be arranged to contact the lower surface of not the first sliding panel 38 but the front moulding 44.

Figure 14:
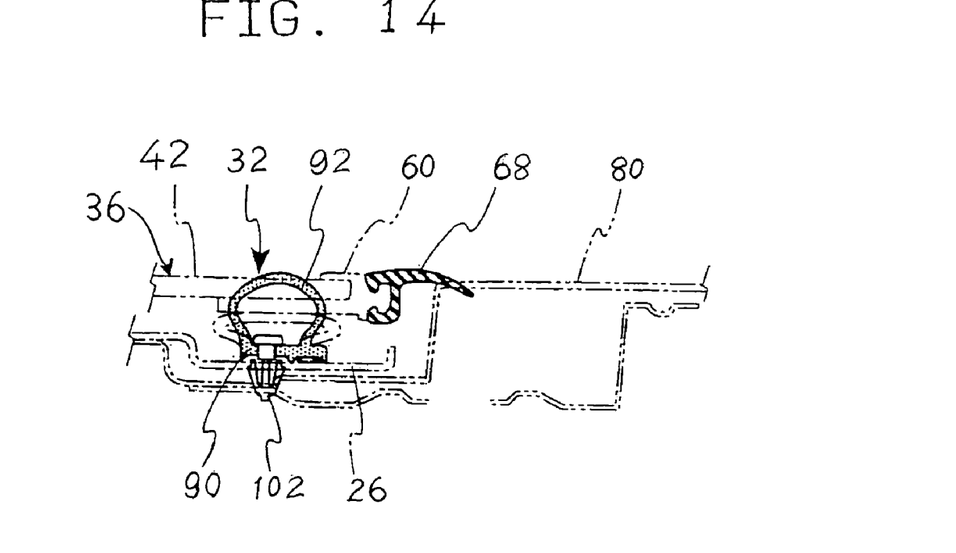
FIG. 14 is a partially cut-away cross-sectional view of one embodiment of a sealing structure in accordance with the present invention along a rear edge of a sliding roof of the motor vehicle.

FIG. 14 is a cross-sectional view of a rear part of the sliding roof 36 in a closed position. As shown, the base portion 90 of the roof panel main seal 32 is attached to the frame member 26 secured to the outer panel 80. The tubular seal portion 92 of the roof panel main seal 32 contacts a lower surface of the third sliding panel 42. The rear moulding 60 is provided along the rear edge of the third sliding panel 42 and the second sliding roof sub-seal 68 is attached to the rear moulding 60. When the sliding roof 36 is closed, the third sliding panel 42 slides frontward and tilts down to lower a rear part thereof and close the roof opening of the roof panel 12. The second sliding roof sub-seal 68 extends to the outer panel 80 of the roof panel 12 to seal between the third sliding panel 42 and the outer panel 80, thereby improving the appearance around the rear part of the sliding roof 36.

Where the rear moulding 60 covers the lower surface of the third sliding panel 42 over a great area thereof, the tubular seal portion 92 of the roof panel main seal 32 may be arranged to contact the lower surface of not the third sliding panel 42 but the rear moulding 60, similarly to the case of the first sliding roof 38.

Figure 15:
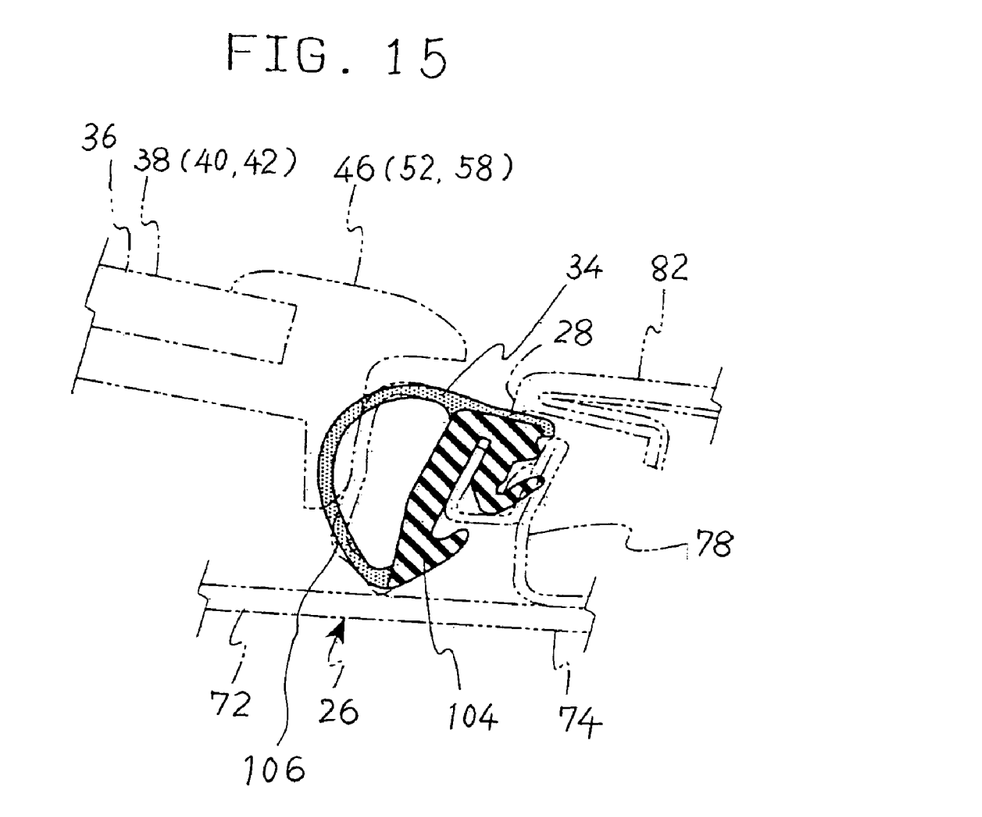
FIG. 15 is a partially cut-away cross-sectional view of a roof panel sub-seal in one embodiment of a sealing structure in accordance with the present invention along a side edge of a sliding roof.

As shown in FIG. 3, the straight roof panel sub-seal 34 is attached to the longitudinal parts of the frame member 26 in nearly parallel with the roof panel main seal 32. FIG. 7 and FIG. 15 show the attaching state of the roof panel sub-seal 34. The roof panel sub-seal 34 includes a base portion 104 to be attached to the vertical part 78 of the frame member 26, and a tubular seal portion 106 for contacting the side mouldings 46, 52 and 58 of the sliding roof 36.

The base portion 104 is composed of a solid material while the tubular portion 106 is composed of a sponge material. These materials are selected from synthetic rubbers such as EPDM rubber. The roof panel sub-seal 34 thus arranged is formed by extruding these rubbers. An upper surface of the base portion 104 is covered with one part of the tubular seal portion 106 to conceal a joint between the solid material and the sponge material, thereby improving the appearance of the roof panel sub-seal 34.

The base portion 104 defines a slot for inserting an end of the vertical part 78 of the frame member 26. By inserting the end of the vertical part 78 in this slot, the base portion 104 is fitted to the frame member 26. The base portion 104 composed of a solid rubber exhibits high rigidity so as to be mounted on the frame member 26 securely.

The tubular seal portion 106 is provided inside the base portion 104, and has a tubular and curved configuration. When the sliding roof 36 is closed, the first, second and third sliding panels 38, 40 and 42 tilt down, and the tubular seal portion 106 contacts side surfaces of the side mouldings 46, 52 and 58 to seal between the opening portion 28 and the sliding roof 36. The tubular seal portion 106 having a tubular and curved configuration, and composed of a sponge rubber exhibits flexibility so as to readily absorb the scattering in the gap between the side mouldings 46, 52 and 58 and the tubular seal portion 106.

The roof panel sub-seal 34 and the roof panel main seal 32 doubly seal side edges of the sliding roof 36 to prevent the intrusion of rainwater, etc. into a vehicle compartment, thereby improving the sealing properties. Rainwater, etc. leaked from the roof panel sub-seal 34 enters a drain (FIG. 7) provided in the protruding part 72 of the frame member 26 and is discharged outside the vehicle body. Accordingly, no drip channel is needed under the roof panel sub-seal 34 so that the structure of the roof panel 12 can be made compact.

The roof moulding 82 is provided between the outer panel 80 of the roof panel 12 and the roof panel sub-seal 34 to cover a gap therebetween, thereby improving the appearance therearound.

Hereinafter, the method for attaching the roof panel main seal 32 to the frame member 26 will be explained. As shown in FIG. 9, the base portion 94 of the roof panel main seal 32 has a generally plate-shaped configuration, and the double-sided adhesive tape 103 is bonded to the lower surface thereof. The roof panel main seal 32 is bonded to the frame member 26 with the double-sided adhesive tape 103.

Protrusions 98 provided along both side edges of the base portion 94 contact and press the frame member 26 secured to the opening portion 28 of the roof panel 12 to seal between the frame member 26 and the roof panel main seal 32. The configuration of the tubular seal portion 92 is not limited to the tubular configuration, and may have a lip-shaped configuration.

Clip holes 94 are provided in the base portion 94 with predetermined intervals. By inserting a head of each of clips 102 into the clip hole 94, and inserting legs of each clip 102 in a hole provided in the frame member 26, the roof panel main seal 32 is attached to the frame member 26. Since the clips 102 and the double-sided adhesive tap 103 are used, the roof panel main seal 32 can be attached more securely and stably, and the sealing properties between the roof panel main seal 32 and the frame member 26 are also improved.

As shown in FIG. 8, the roof panel main seal 32 has rounded corners 88 and 98. The double sided adhesive tape 103 is bonded to a bottom surface of the roof panel main seal 32 including rounded corners 88 and 98.

Figure 16:
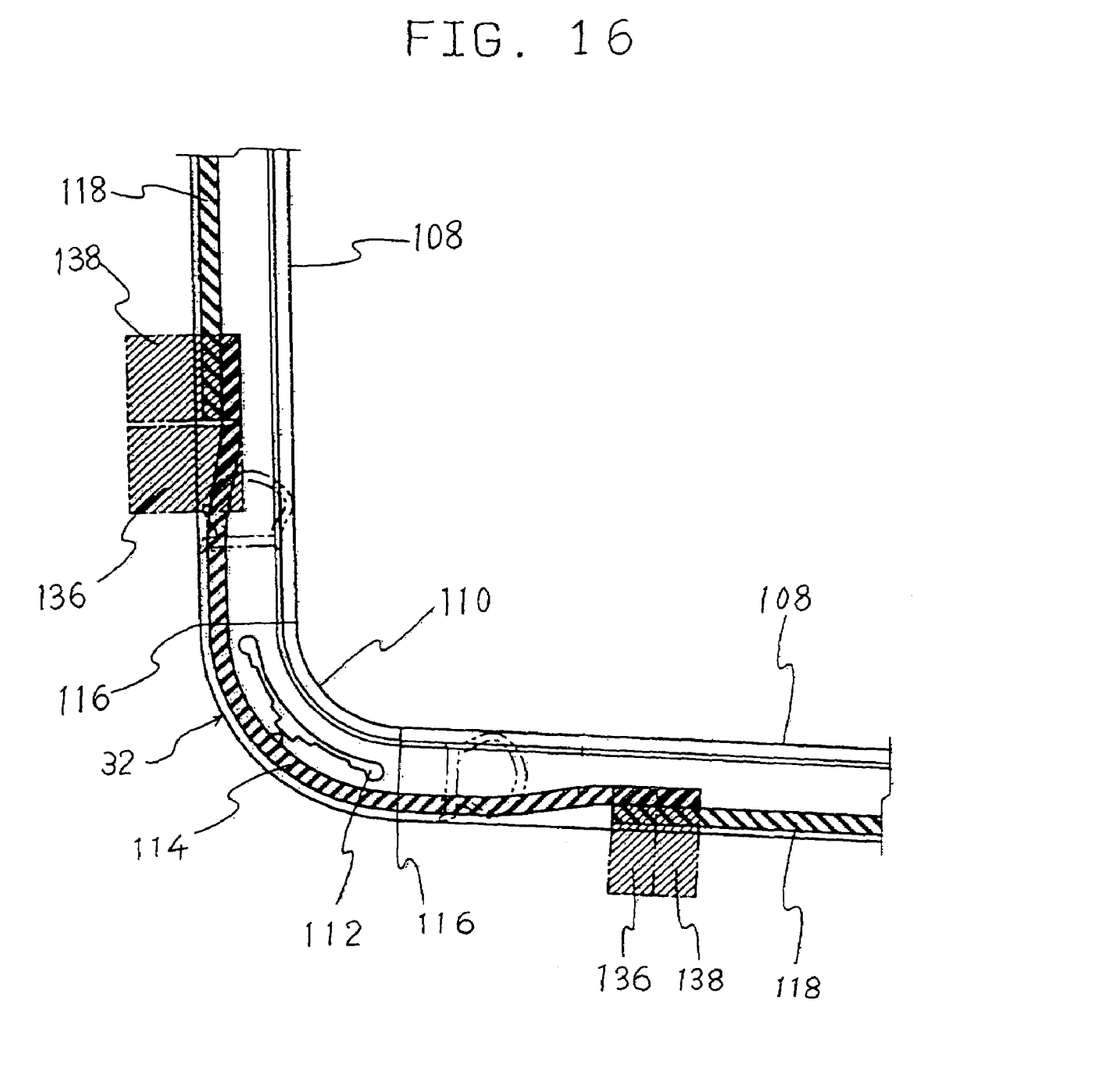
FIG. 16 is a bottom view of a corner of the roof panel main seal.

As shown in FIG. 16, the roof panel main seal 32 includes straight parts 108 such as the front part 82, rear part 84 and side parts 86 (FIG. 8), and a molded corner part 110. When the corner part 110 is molded, the straight parts 108 are jointed to the corner part 110 integrally by vulcanization. A hole 112 is provided in a bottom surface of the corner part 110 for removing a core therefrom.

Straight double-sided adhesive tapes 118 are bonded to the bottom surface of the base portion 94 of the straight parts 108 such that ends thereof do not extend to joints 116 between the corner part 110 and the straight parts 108. A double-sided adhesive tape 114 is bonded to the bottom surface of the base portion 94 of the corner part 110. The double-sided adhesive tape 114 is formed to have a curvature identical to that of the corner part 110 by punching a flat double-sided adhesive tape by means of a punching die having a curvature identical to that of the corner part 110. Ends of the double-sided adhesive tape 114 extend over the joints 116 and curves inwardly to contact the ends of the straight double-sided adhesive tapes 118.

With this arrangement, expansion and contraction of the adhesive tapes 114 and 118, which occur upon bonding them to the bottom surface of the base portion 94, can be absorbed, thereby facilitating the bonding work of the adhesive tapes 114 and 118.

Figure 17:
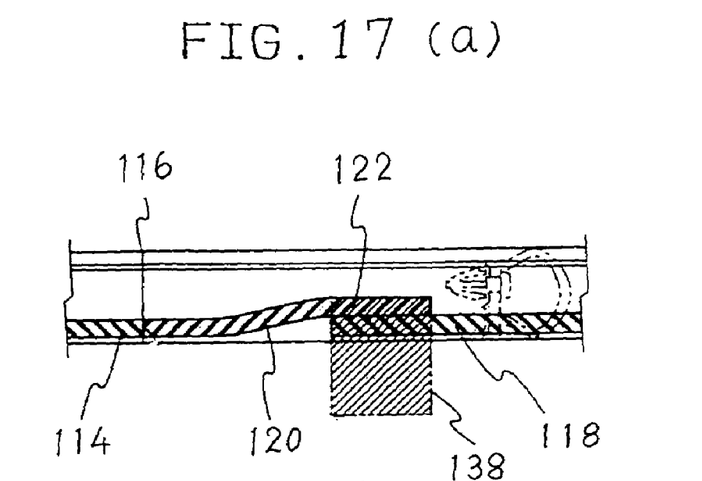
FIG. 17(a) is a partially cut-away bottom view of the roof panel main seal, which shows a first example of a joining state of two double-sided adhesive tapes.
FIG. 17(b) is a partially cut-away bottom view of the roof panel main seal, which shows a second example of a joining state of two double-sided adhesive tapes.
FIG. 17(c) is a partially cut-away bottom view of the roof panel main seal, which shows a third example of a joining state of two double-sided adhesive tapes.

In FIG. 16, the double-sided adhesive tape 114 is formed into a single tape. Alternatively, as shown in FIG. 17(*a*), a short double-sided adhesive tape 120 may be provided and bonded to the bottom surface of the base portion 94 from the joint 116 to the end of the straight adhesive tape 118. The double-sided adhesive tape 120 can cover the area between the double-sided adhesive tapes 114 and 118 entirely to prevent rainwater, etc. from intruding from this area. Since the double-sided adhesive tape 120 is short, it can be readily curved inwardly without generating wrinkles therein. In addition, expansion and contraction of the double-sided adhesive tape 120 can be absorbed in the contacting area with the straight double-sided adhesive tape 118.

Alternatively, the double-sided adhesive tape 120 is bonded such that one end thereof faces and contacts the end of the double-sided adhesive tape 118, and the other end of the double-sided adhesive tape 120 curves and contacts the end of the curved double-sided adhesive tape 114.

FIGS. 17(*b*) and 17(*c*) respectively show other embodiments of the double-sided adhesive tapes. In FIG. 17(*b*), the double-sided adhesive tape 114 is bonded such that an end thereof faces an end of the straight double-sided adhesive tape 118 at the joint 116 with a gap 124, and a short straight double-sided adhesive tape 126 is bonded in contact with the facing ends of the double-sided adhesive tapes 114 and 118 to cover the gap 124. This short straight double-sided adhesive tape 126 can cover the gap 124 to prevent the intrusion of rainwater, etc. from the gap 124. In FIG. 17(*c*), a short double-sided adhesive tape 128 is bonded to the bottom surface of the base portion 94 from the joint 116 to the contacting area with the straight adhesive tape 118 such that one end 130 of the short double-sided adhesive tape 128 contacts an end of the double-sided adhesive tape 114 at the joint 116 and the other end 132 of the short double-sided adhesive tape 128 bends inwardly into a step-shaped configuration and contacts the end of the straight adhesive tape 118 with a gap 134. The short double-sided adhesive tape 128 having a bending end 132 is formed by punching a flat double-sided adhesive tape.

With this step-shaped bending end 132 of the short double-sided adhesive tape 128, the facing end of the straight adhesive tape 118 can be covered to prevent the intrusion of rainwater, etc. from the gap 134.

To bond the above-described double-sided adhesive tapes to the frame member 26, tab tapes 136 and 138 bonded to ends thereof are respectively pulled to peel protective tapes therefrom.

Hereinafter, several examples of a panel seal for sealing between the first sliding panel 38 and the second sliding panel 40 of the sliding roof 36 will be explained. These examples are applicable to a panel seals for sealing between the second sliding panel 40 and the third sliding panel 42, or for sealing between adjacent two sliding panels.

Figure 18:
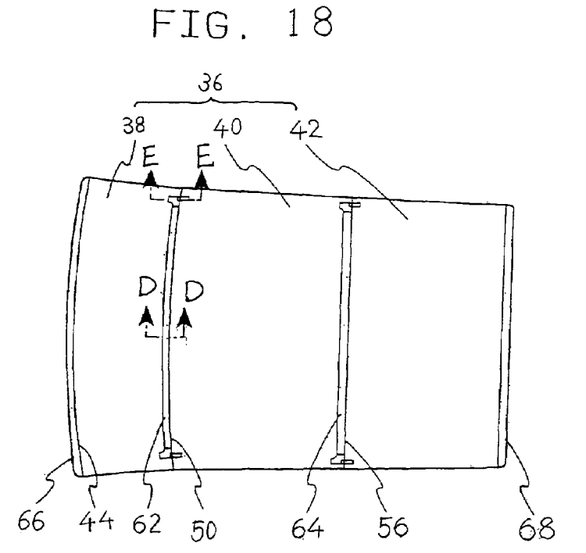
FIG. 18 is a plan view of a sliding roof in one embodiment of the sealing structure in accordance with the present invention, to which panel seals are attached.

FIG. 18 is a plan view of the sliding roof 36 composed of the first, second and third sliding panels 38, 40 and 42. The first sliding roof sub-seal 66 is provided along the front edge of the first sliding panel 38, the first panel seal 62 is provided between the first sliding panel 38 and the second sliding panel 40, the second panel seal 64 is provided between the second sliding panel 40 and the third sliding panel 42, and the second sliding roof sub-seal 68 is provided along the rear edge of the third sliding panel 42. The first panel seal 62 is attached to the front moulding 50 of the second sliding panel 40, and the second seal 64 is attached to the front moulding 56 of the third sliding panel 42.

Figure 19:
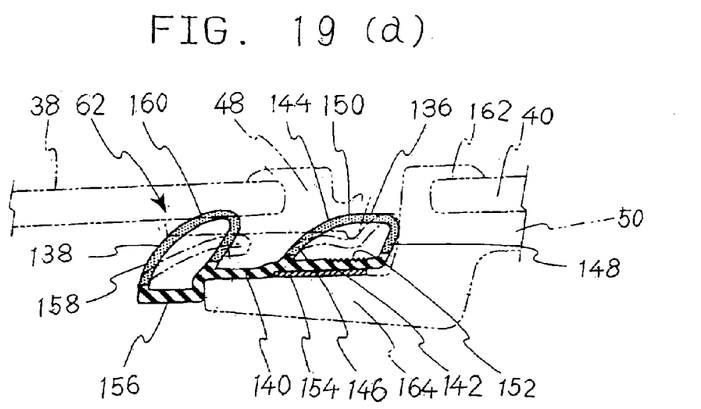
FIG. 19(a) is a cross-sectional view of a longitudinal center of a first panel seal, which is taken along the line D—D of FIG. 18.
FIG. 19(b) is a cross-sectional view of a longitudinal end of a first panel seal, which is taken along the line E—E of FIG. 18.

FIG. 19(*a*) shows a cross-section of the first panel seal 62, which is taken along the line D—D of FIG. 18, and FIG. 19(*b*) shows a cross-section of the first panel seal 62, which is taken along the line E—E of FIG. 18. As shown, the first panel seal 62 is attached to a front edge of the second sliding panel 40. The fist panel seal 62 has a generally straight configuration and includes a rear seal 136 and a front seal 138, each having a tubular configuration. The rear seal 136 and the front seal 138 are connected to each other with a flat connecting part 140. The rear seal 136 has an identical cross-section at its longitudinal end and longitudinal center, and includes a base part 142 and a seal wall 144. The base part 142 has a flat plate-shaped cross-section, and the seal wall 144 is integrally formed with the base part 142. The base part 142 is composed of a solid material such as a synthetic rubber (EPDM, etc.) or thermoplastic elastomer, and the seal wall 144 is composed of a sponge material such as a synthetic rubber (EPDM, etc.) or thermoplastic elastomer. These materials are extruded integrally into a straight configuration.

The seal wall 144 includes a front part 146 projecting from a front end of the base part 142, a rear part 148 projecting from a rear end of the base part 142 and an upper part 150 connecting the front part 146 and the rear part 148 to each other.

A plurality of depressions 152 are provided in an upper surface of the base part 142 so as to extend in the longitudinal direction thereof. When the first sliding panel 38 is closed, the upper part 150 of the seal wall 144 is compressed by the rear moulding 48 of the first sliding panel 38, and may come into close contact with the upper surface of the base part 142. At this time, by virtue of the depressions 152, the contacting area of the upper part 150 and the base part 142 decreases. When the first sliding panel 38 is opened, the upper part 150 of the seal wall 144 immediately separates from the base part 142 to return to its uncompressed configuration.

Consequently, the upper part 150 of the seal wall 144 is prevented from remaining in contact with the base part 142 after the first sliding panel 38 is opened, and accordingly, the decrease of the sealing properties, and the generation of noise when separating from the base part 142 can be prevented.

A double-sided adhesive tape 154 is bonded to the bottom surface of the base part 142. The first panel seal 62 is bonded to the front moulding 50 with the double-sided adhesive tape 154. Since the base part 142 is made of a solid material, it can be attached to the front moulding 50 securely.

As shown in FIGS. 19(*a*) and 19(*b*), the front seal 138 has a tubular configuration, and includes a base part 156 and a seal wall 158. The base part 156 has a flat plate-shaped cross-section except for its longitudinal ends, and the seal wall 158 is integrally formed with the base part 156. The base part 156 is composed of a solid material such as synthetic rubber (EPDM, etc.) or thermoplastic elastomer, and the seal wall 158 is composed of a sponge material such as synthetic rubber (EPDM, etc.) or thermoplastic elastomer. These materials are extruded integrally into a straight line-shaped configuration.

When the first sliding panel 38 is in a closed position, an upper part 160 of the seal wall 158 contacts a lower surface of the rear moulding 48 attached to the first sliding panel 38 to seal therebetween.

The base part 156 of the front seal 138 is connected to the base part 142 of the rear seal 136 with the flat connecting part 140. Since the base part 156, the base part 142 and the flat connecting part 140 are composed of a solid material, the front seal 138 and the rear seal 136 are connected to each other firmly. By bonding the base part 142 of the rear seal 136 with the double-sided adhesive tape 154, the front seal 138 can be also secured.

The rear seal 136, the front seal 138 and the connecting part 140 can be formed simultaneously and integrally.

The front molding 50 mounted along a front edge of the second sliding panel 40 includes a roof attaching part 162 having a U-shaped cross section, and a seal attaching part 168 having an L-shaped cross section, which extends form the roof attaching part 162 for attaching the first panel seal 62. The rear part 148 of the seal wall 144 contacts a vertical wall of the roof attaching part 162 of the front moulding 50. When the first sliding panel 38 is in a closed position, the upper part 150 of the seal wall 144 contacts the rear moulding 48 attached to the first sliding panel 38 to seal therebetween As shown in FIG. 19(a), by placing a corner between the connecting part 140 and the base part 156 of the front seal 138 on a front edge of the seal attaching part 168 of the front moulding 50 which is mounted on the second sliding panel 40, the front seal 138 is stably positioned so that the seal part 158 can seal around the rear moulding 48 of the first sliding panel 38.

Since the seal wall 144 of the rear seal 136 is spaced apart from the seal wall 158 of the front seal 138, these seal walls 144 and 158 do not overlap each other where the seal wall 158 is compressed by the rear moulding 48 and deformed toward the seal wall 144.

Accordingly, the deformed seal wall 158 has a reduced height, whereby the gap between the rear moulding 48 and the front moulding 50 can be decreased, and accordingly, the sliding roof can be made compact.

As shown in FIG. 19(b), at longitudinal ends of the first panel seal 62, both the base part 156 and the seal wall 158 have configurations different from those of the longitudinally central portion thereof (FIG. 19(a)). The base part 156 has a curved plate-shaped cross-section, and its front end protrudes obliquely to define a protruding part 166. The protruding part 166 tapers such that the thickness thereof gradually decreases toward a protruding end thereof.

The base part 156 is further provided with a cover lip 168 extending from a bottom surface of the base part 156 rearward in parallel with the connecting part 140 to define a slot between the connecting part 140 and the cover lip 168 for receiving a front end of the front moulding 50. With this arrangement, the base part 142 can be secured to the front moulding 50. Since the base part 142 is composed of a solid material, the front seal 158 can be attached to the rear moulding 50 securely.

The cover lip 168 tapers such that the thickness thereof gradually decreases toward an end thereof. When the sliding roof 36 is closed, and the cover lip 168 contacts the upper surface of the roof panel seal, the tapering cover lip 168 prevents the generation of a gap between the front moulding 50 and the roof panel weather strip, thereby effecting good sealing properties.

The seal wall 158 also protrudes frontward and is integrally connected to the protruding part 166.

The sliding roof 36 is composed of three sliding panels 38, 40 and 42 in the present embodiment. Alternatively, the sliding roof 36 may be composed of two sliding panels.

When the sliding roof 36 is closed, the first sliding roof sub-seal 66 attached to the front molding 44 of the first sliding panel 38 contacts the opening portion 28 of the roof panel 12 to seal the same.

In the present embodiment, the rear seal 136 and the front seal 138 are made away from each other to define a space therebetween. This space can be used as a drain channel for draining intruded rainwater, etc.

When the second sliding panel 40 tilts up to lower the front edge thereof, and rainwater, etc. remaining on an upper surface of the second sliding panel 40 overflows from the front edge thereof, the overflowing rainwater, etc. drops into the defined drain channel and discharged outside the channel. Consequently, rainwater, etc. remaining on the upper surface of the second sliding panel 40 can be securely prevented from intruding into the vehicle compartment.

In accordance with the present invention, since the annular roof panel main seal and the straight roof panel sub seals are provided to seal between the tiltable sliding roof and the opening portion of the roof of the motor vehicle, double sealing is effected, thereby improving the sealing properties thereof.

In addition, in accordance with the present invention, since the annular roof panel main seal is arranged to contact the lower surface of the sliding roof, stable sealing properties can be achieved, and the construction of the roof panel can be made compact.

Furthermore, in accordance with the present invention, since double-sided adhesive tapes are bonded to the bottom of the base portion of the annular roof panel main seal for sealing between the sliding roof and an opening portion of a motor vehicle such that the double-sided adhesive tape for boding to a corner of the bottom of the base portion has the same curvature as that of the corner of the bottom of the base portion, the annular roof panel main seal can be attached to the opening portion readily and securely with good sealing properties.

And, in accordance with the present invention, since the panel seal for sealing between adjacent sliding panels is provided with a plurality of longitudinally extending depressions in its base part, the panel seal is free from the generation of noise.

In accordance with the present invention, since the panel seal for sealing a gap between adjacent sliding panels has a front seal and a rear seal of which seal walls are adapted to contact a rear edge of a closed sliding panel, double sealing can be effected, thereby improving sealing properties. And since the panel seal is attached only to the front edge of the rear-side sliding panel, the attachment of the panel seal is facilitated, and the scattering in the attachment of the panel seal is reduced. In addition, since the drain channel is defined between the front seal and the rear seal, the intrusion of rainwater, etc. remaining on the sliding panel can be surely prevented when the sliding roof is opened.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure of a sliding roof of a motor vehicle for sealing between a tiltable sliding roof and an opening portion of a roof panel, comprising:

an annular frame member which is secured along the opening portion of the roof panel;

an annular roof panel main seal for contacting a lower surface of a periphery of the sliding roof when the sliding roof is closed, wherein said roof panel main seal includes a flat plate-shaped base portion for attachment to said frame member, and a tubular seal portion protruding upwardly of said base portion into an arc-shaped configuration; and a roof panel sub-seal for contacting side edges of the sliding roof when the sliding roof is closed, said roof panel main seal and said roof panel sub-seal being attached to said annular frame member, wherein said roof panel sub-seal is straight and includes a base portion having a generally U-shaped cross-section, and a tubular seal portion protruding inwardly of said base portion into an arc-shaped configuration.

2. A sealing structure of a sliding roof of a motor vehicle for sealing between a tiltable sliding roof and an opening portion of a roof panel, comprising:

an annular frame member which is secured along the opening portion of the roof panel;

an annular roof panel main seal for contacting a lower surface of a periphery of the sliding roof when the sliding roof is closed, wherein said roof panel main seal includes a flat plate-shaped base portion for attachment to the opening portion of the roof opening and a tubular seal portion provided integrally with said base portion, wherein a double-sided adhesive tape is bonded to a surface of said base portion, which is opposite to said tubular seal portion, said base portion is attached to the opening portion with said double-sided adhesive tape, and said double-sided adhesive tape includes a curved double-sided adhesive tape for attachment to a corner of the opening portion, which has the same curvature as that of said corner of the opening portion; and a roof panel sub-seal for contacting side edges of the sliding roof when the sliding roof is closed, said roof panel main seal and said roof panel sub-seal being attached to said annular frame member.

3. A sealing structure as claimed in claim 2, wherein said double-sided adhesive tape further includes a straight double-sided adhesive tape for attachment to a straight part of the opening portion, and said curved double-sided adhesive tape and said straight double-sided adhesive tape are bonded such that side edges of ends thereof contact each other at a joint thereof.

4. A sealing structure as claimed in claim 2, wherein said double-sided adhesive tape further includes a straight double-sided adhesive tape for attachment to a straight part of the opening portion, said curved double-sided adhesive tape and said straight double-sided adhesive tape are bonded such that ends thereof face each other with a space therebetween, and a short double-sided adhesive tape is further bonded so as to extend in parallel with and adjacently to said ends of said curved double-sided adhesive tape and said straight double-sided adhesive tape, and cover said space therebetween.

5. A sealing structure as claimed in claim 2, wherein said double-sided adhesive tape further includes a straight double-sided adhesive tape for attachment to a straight part of the opening portion, said curved double-sided adhesive tape and said straight double-sided adhesive tape are bonded such that ends thereof face each other with a space therebetween, and another short double-sided adhesive tape of which one end is flat and the other end bends into an L-shaped longitudinal section is bonded to cover said space between said ends of said curved double-sided adhesive tape and said straight double-sided adhesive tape such that said flat end of said another short double-sided adhesive tape contacts one of said ends of said curved double-sided adhesive tape and said straight double-sided adhesive tape, and the other one of said ends of said curved double-sided adhesive tape and said straight double-sided adhesive tape contacts said the other L-shaped end of said another short double-sided adhesive tape in parallel with each other.

6. A sealing structure of a sliding roof of a motor vehicle for sealing between a tiltable sliding roof and an opening portion of a roof panel, comprising:

an annular frame member which is secured along the opening portion of the roof panel;

an annular roof panel main seal for contacting a lower surface of a periphery of the sliding roof when the sliding roof is closed; and a roof panel sub-seal for contacting side edges of the sliding roof when the sliding roof is closed, said roof panel main seal and said roof panel sub-seal being attached to said annular frame member, wherein:

the sliding roof includes a plurality of sliding panels arranged longitudinally of a body of the vehicle;

a panel seal is provided to seal between adjacent sliding panels, said panel seal includes a rear seal and a front seal;

said rear seal has a base part, for attachment to a front edge of a rear-side sliding panel, and a seal wall formed integrally with said base part so as to protrude upwardly therefrom;

said front seal is provided on the front side of said rear seal and has a base part, which extends parallel with said base part of said rear seal, a seal wall formed integrally with said base part so as to protrude upwardly therefrom;

said panel seal includes a connecting part for connecting said base part of said rear seal and said base part of said front seal;

said rear seal, said front seal and said connecting part define a U-shaped drain channel;

said seal walls of said rear seal and said front seal are arranged to contact a rear edge of the sliding panel on the front side of said panel seal, thereby effecting double sealing; and said rear seal has a plurality of depressions in an upper surface of said base part so as to extend in a longitudinal direction thereof.

7. A sealing structure as claimed in claim 6, wherein said base part of said rear seal, said base part of said front seal, and said connecting part are composed of a solid material, and said seal wall of said rear seal and said seal wall of said front seal are composed of a sponge material.

8. A sealing structure as claimed in claim 6, wherein one resin moulding is mounted on a front edge of at least one of the sliding panels on the rear side of said panel seal, and another resin moulding is mounted on a rear edge of an adjacent one of the sliding panels on the front side of said panel seal, said base part of said rear seal is attached to said one resin moulding, and said seal wall of said rear seal and said seal wall of said front seal respectively contact said another resin moulding when the sliding panels are closed.

* * * * *